(12) United States Patent
Kojima et al.

(10) Patent No.: US 11,640,509 B2
(45) Date of Patent: May 2, 2023

(54) PRINTING APPARATUS AND PRINTING METHOD

(71) Applicant: SEIKO EPSON CORPORATION, Tokyo (JP)

(72) Inventors: Takayoshi Kojima, Nagano (JP);
Tomoyuki Nakano, Nagano (JP);
Masahiro Murata, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 81 days.

(21) Appl. No.: 17/410,050

(22) Filed: Aug. 24, 2021

(65) Prior Publication Data

US 2022/0063290 A1 Mar. 3, 2022

(30) Foreign Application Priority Data

Aug. 26, 2020 (JP) .............................. JP2020-142418

(51) Int. Cl.
| | | |
|---|---|---|
| *B41J 2/21* | (2006.01) | |
| *G06K 15/10* | (2006.01) | |
| *G06K 15/00* | (2006.01) | |
| *G06K 15/02* | (2006.01) | |
| *H04N 1/407* | (2006.01) | |
| *H04N 1/60* | (2006.01) | |

(52) U.S. Cl.
CPC ......... *G06K 15/407* (2013.01); *G06K 15/102* (2013.01); *G06K 15/1809* (2013.01); *G06K 15/1823* (2013.01); *H04N 1/407* (2013.01); *H04N 1/60* (2013.01)

(58) Field of Classification Search
CPC ............... G06K 15/407; G06K 15/102; G06K 15/1809; G06K 15/1823; H04N 1/407; H04N 1/60
See application file for complete search history.

(56) References Cited

U.S. PATENT DOCUMENTS 10,226,955 B2 * 3/2019 Hauck ................ B41J 11/00216
2019/0098177 A1 * 3/2019 Yoshida ............... H04N 1/6027

FOREIGN PATENT DOCUMENTS

JP 2007-195244 A 8/2007

* cited by examiner

*Primary Examiner* — Quang N Vo
(74) *Attorney, Agent, or Firm* — Global IP Counselors, LLP (57) ABSTRACT

A printing apparatus includes a head capable of discharging CMYK inks including a K ink, and a control unit configured to, based on image data to be printed, generate ink amount data for controlling an ink amount of each of the CMYK inks discharged by the head, and to control the head based on the ink amount data, wherein the control unit generates the ink amount data as ink amount data such that lightness of a composite color at least does not increase in a direction from a freely-selected coordinate point toward a black point, the composite color being formed by the CMY inks excluding the K ink based on ink amount data of each of the CMYK inks corresponding to a coordinate on a straight line from the freely-selected coordinate point toward the black point in a predetermined hue range of a color gamut of a color space of the image data.

5 Claims, 7 Drawing Sheets

PRINTING APPARATUS AND PRINTING METHOD

The present application is based on, and claims priority from JP Application Serial Number 2020-142418, filed Aug. 26, 2020, the disclosure of which is hereby incorporated by reference herein in its entirety.

BACKGROUND

1. Technical Field

The present disclosure relates to a printing apparatus performing color printing using a plurality of inks and a printing method.

2. Related Art

Techniques are known for combining chromatic color inks such as cyan, magenta, and yellow to generate composite black that is an achromatic color. JP 2007-195244 A discloses a printing method in which, when, among gray scale values of respective color inks that are chromatic colors, a gray scale value of each chromatic ink corresponding to expressing an achromatic color, is equal to or greater than a predetermined gray scale value individually defined in accordance with a hue expressed by color image data, at least some of gray scale values each expressing an achromatic color in accordance with the hue expressed by the color image data are replaced with a gray scale value of a black ink and fixed as a combination of the gray scale values of the respective color inks, and printing is performed based on the combination of the gray scale values of the respective color inks.

According to this printing method, while conspicuousness of a dot of the black ink differs depending on a hue of an image on which the dot is formed, the black ink dot is formed with a ratio corresponding to the hue of the color image, and thus a formation amount of the black ink dots becomes more appropriate, and it is possible to print a high-quality image in which deterioration of granularity caused by forming black ink dots is suppressed.

However, in a printed material that has been printed by the printing method described in JP 2007-195244 A, there is a problem in that, when the black ink becomes faded over time, in other words, when lightness of the black ink changes to increase over time, a region where lightness of a color image is reversed may be generated, such as a darkest portion of a printed image becoming no longer the darkest portion.

SUMMARY

A printing apparatus according to the present disclosure includes a head capable of discharging a plurality of inks including a black-based ink, and a control unit configured to, based on image data to be printed, generate ink amount data for controlling an ink amount of each of the plurality of inks discharged by the head, and to control the head based on the ink amount data, wherein the control unit generates the ink amount data as ink amount data such that lightness of a composite color at least does not increase in a direction from a freely-selected coordinate point toward a black point, the composite color being formed by the plurality of inks excluding the black-based ink based on ink amount data of each of the plurality of inks corresponding to a coordinate on a straight line from the freely-selected coordinate point toward the black point in a predetermined hue range of a color gamut of a color space of the image data.

A printing apparatus according to the present disclosure includes a head capable of discharging a plurality of inks including a black-based ink, and a control unit configured to, based on image data to be printed, generate ink amount data for controlling an ink amount of each of the plurality of inks discharged by the head, and to control the head based on the ink amount data, wherein the control unit generates the ink amount data as ink amount data such that lightness of a composite color at least does not increase in a direction from a freely-selected coordinate point toward a black point, the composite color being formed by the plurality of inks excluding the black-based ink based on ink amount data of each of the plurality of inks corresponding to a coordinate on a straight line from the freely-selected coordinate point toward the black point in a predetermined hue range of a color gamut of a color space of the image data, and by a virtual gray-based ink having lightness higher than the black-based ink based on ink amount data of the black-based ink by a predetermined amount.

A printing method according to the present disclosure is a printing method for, based on image data to be printed, performing printing using a plurality of inks including a black-based ink, that includes an ink amount data generating step of, based on the image data, generating ink amount data of each of the plurality of inks, and a printing step of, based on the generated ink amount data, performing the printing, wherein the ink amount data generating step generates the ink amount data as ink amount data such that lightness of a composite color at least does not increase in a direction from a freely-selected coordinate point toward a black point, the composite color being formed by the plurality of inks excluding the black-based ink based on ink amount data of each of the plurality of inks corresponding to a coordinate on a straight line from the freely-selected coordinate point toward the black point in a predetermined hue range of a color gamut of a color space of the image data.

DESCRIPTION OF EXEMPLARY EMBODIMENTS

1. Exemplary Embodiment 1

Figure 1:
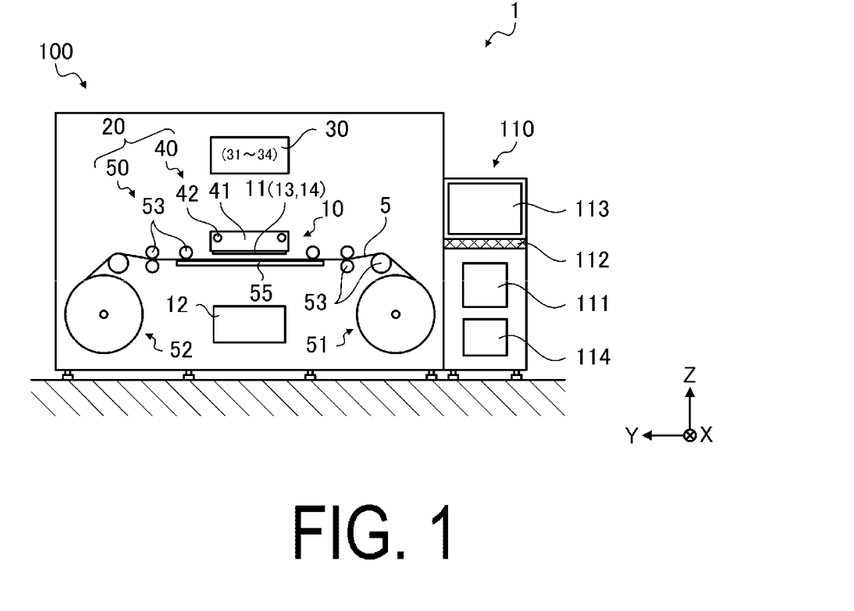
FIG. 1 is a front view illustrating a configuration of a printing apparatus according to Exemplary Embodiment 1.
Figure 2:
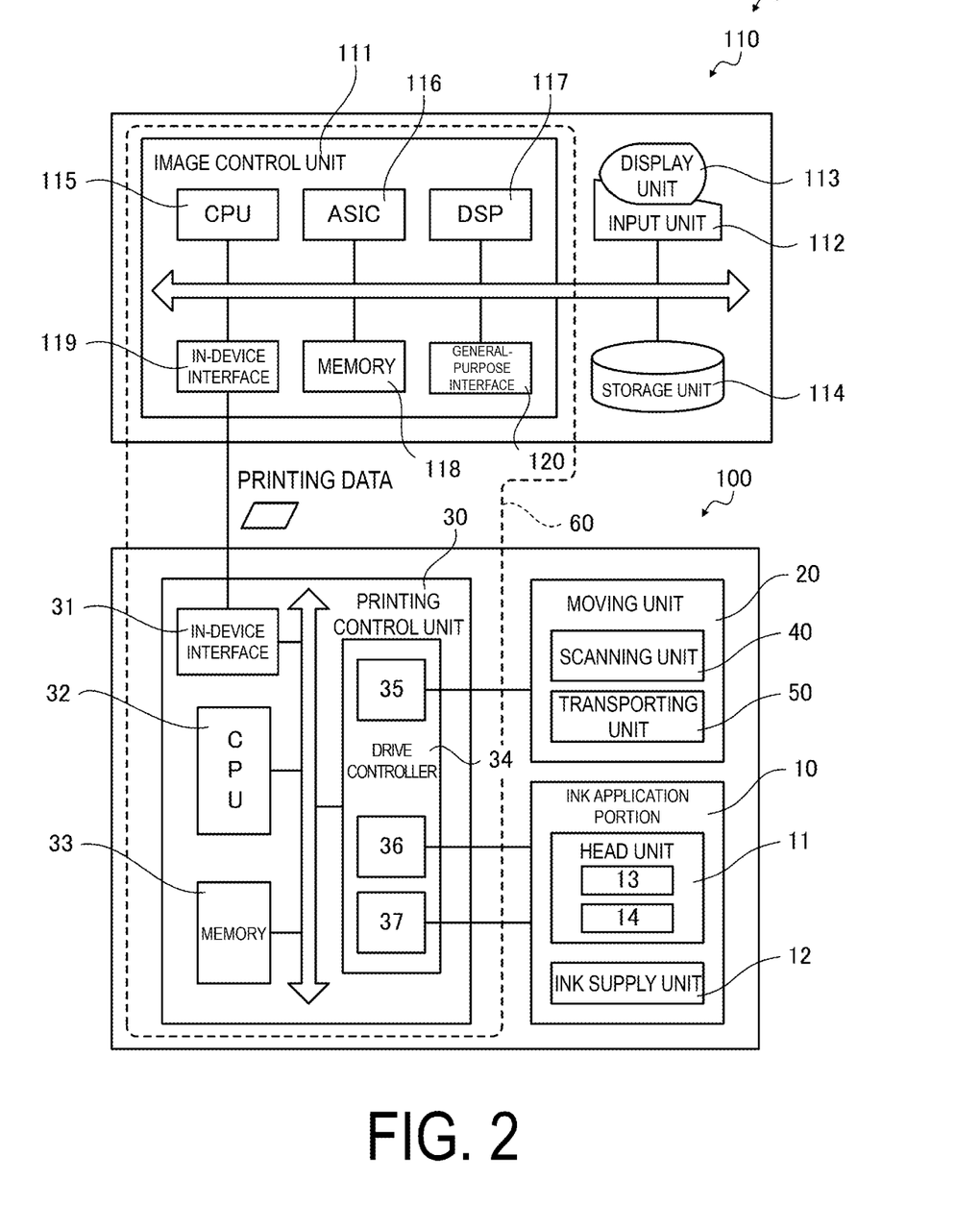
FIG. 2 is a block diagram illustrating a configuration of the printing apparatus according to Exemplary Embodiment 1.

A configuration of a printing apparatus 1 according to the present exemplary embodiment will be described with reference to FIG. 1 and FIG. 2.

Note that, as for coordinates given in the drawings, it is assumed that a Z-axis direction is an up/down direction, a +Z direction is an upward direction, an X-axis direction is a front/rear direction, a −X direction is a frontward direction, a Y-axis direction is a left/right direction, a +Y direction is a leftward direction, and an X-Y plane is a horizontal plane.

The printing apparatus 1 includes a printing unit 100, and an image processing unit 110 coupled to the printing unit 100.

The printing unit 100 is an inkjet printer that prints a desired image on a long-length printing medium 5 set in a roll shape, based on printing data received from the image processing unit 110.

The image processing unit 110 includes an image control unit 111, an input unit 112, a display unit 113, a storage unit 114, and the like, and controls print jobs for printing to be performed by the printing unit 100. Further, the image processing unit 110 generates printing data used to cause the printing unit 100 to print a desired image based on image data.

Software operated by the image processing unit 110 includes general image processing application software that deals with image data to be printed, and printer driver software that generates printing data for controlling the printing unit 100 and causing the printing unit 100 to perform printing, and a color conversion look-up table creating program for creating a color conversion look-up table necessary for generating printing data. In the following description, the image processing application software is simply referred to as an image processing application, and the printer driver software is simply referred to as a printer driver.

Here, the image data refers to RGB digital image information including text data, full-color image data, and the like.

The image control unit 111 includes a CPU 115, an ASIC 116, a DSP 117, a memory 118, an in-device interface 119, a general-purpose interface 120, and the like, and performs centralized management of the entire printing apparatus 1. CPU means Central Processing Unit, ASIC means Application Specific Integrated Circuit, and DSP means Digital Signal Processor. The input unit 112 is an information input means serving as a user interface. Specifically, the input unit 112 is, for example, a keyboard, a mouse pointer, and the like.

The display unit 113 is an information display means as a user interface, and displays information input from the input unit 112, images to be printed by the printing unit 100, information related to a print job, and the like, under control of the image control unit 111.

The storage unit 114 is a rewritable storage medium such as a hard disk drive or a memory card, and stores programs run by the image control unit 111 as software run by the image processing unit 110, an image to be printed, information about a print job, and the like.

The memory 118 is a storage medium that secures a region for storing programs run by the CPU 115, a work region in which such programs run, and the like, and includes storage elements such as a RAM and an EEPROM. RAM means Random Access Memory, and EEPROM means Electrically Erasable Programmable Read-Only Memory.

The general-purpose interface 120 is an interface capable of coupling external electronic devices, such as a LAN interface and a USB interface. LAN means Local Area Network, and USB means Universal Serial Bus. In the present exemplary embodiment, the general-purpose interface 120 is a data acquisition unit that acquires image data from an external electronic device under control of the CPU 115.

The printing unit 100 includes an ink application portion 10, a moving unit 20, a printing control unit 30, and the like. The printing unit 100 that has received printing data from the image processing unit 110 controls, by the printing control unit 30, the ink application portion 10 and the moving unit 20 based on the printing data to print an image on the printing medium 5.

The printing data is image formation data obtained by converting the image data so that the printing unit 100 can print the image data using an image processing application and a printer driver included in the image processing unit 110, and includes a command for controlling the control unit 100.

The ink application portion 10 includes a head unit 11, an ink supply unit 12, and the like.

The moving unit 20 includes a scanning unit 40, a transporting unit 50, and the like.

The scanning unit 40 includes a carriage 41, a guide shaft 42, a carriage motor, and the like. The carriage motor is omitted from the illustration.

The transporting unit 50 includes a supply unit 51, a housing unit 52, transport rollers 53, a platen 55, and the like.

The head unit 11 includes a head 13 including a plurality of nozzle rows in each of which a plurality of nozzles are lined up for discharging printing ink as ink droplets, and a head control unit 14. The head unit 11 is mounted on the carriage 41, and moves back and forth in the X-axis direction along with the carriage 41 that moves in the X-axis direction as a scanning direction.

The ink supply unit 12 includes an ink tank, an ink supply path that supplies ink from the ink tank to the head 13, and the like. The ink tank and the ink supply path are omitted from the drawings.

As ink, an ink set of four colors is used, as a plurality of colors, obtained by adding a black ink as a black-based ink to an ink set of three colors of cyan, magenta, and yellow. That is, the head 13 is capable of discharging the plurality of inks including the black-based ink. Hereinafter, the inks of the three colors of cyan, magenta, and yellow are referred to as CMY inks, and the black ink is referred to as a K ink.

The ink tank, the ink supply path, and an ink supply route to nozzles that discharge the same ink are provided separately for each ink.

Note that, the plurality of inks are not limited to the four color inks described above. For example, an eight-color ink set obtained by adding an ink set of light cyan, light magenta, light yellow, and light black with reduced concentrations of the respective color materials, and the like, may be used. Furthermore, the black-based ink means a black ink, which is not limited to an ink exhibiting a pure black color, and it is sufficient that an ink is used with which the printing apparatus 1 can print a black point, which is a monochromatic and darkest dot.

The moving unit 20, that is, the scanning unit 40 and the transporting unit 50 causes the printing medium 5 to relatively move with respect to the head 13 under control of the printing control unit 30.

The guide shaft 42 extends in the X-axis direction and supports the carriage 41 in a slidable contact state. Further, the carriage motor serves as a driving source when reciprocating the carriage 41 along the guide shaft 42. That is, the scanning unit 40 causes the carriage 41, that is, the head 13, to move in the X-axis direction along the guide shaft 42 under the control of the printing control unit 30. The head 13 included in the head unit 11 mounted on the carriage 41 discharges ink droplets onto the printing medium 5 supported by the platen 55 under the control of the printing control unit 30 while moving in the X-axis direction, and thus a plurality of dot rows along the X-axis direction are formed on the printing medium 5.

Note that, in the present exemplary embodiment, the image control unit 111 and the printing control unit 30 constitute a control unit 60 that controls the head 13 and the moving unit 20 and performs printing based on image data.

The supply unit 51 rotatably supports a reel on which the printing medium 5 is wounded into a roll, and the supply unit 51 feeds the printing medium 5 into the transport path. The housing unit 52 rotatably supports a reel, on which the printing medium 5 is wound, and reels off the printing medium 5, on which printing is completed, from the transport path.

The transport rollers 53 include a driving roller that causes the printing medium 5 to move on an upper surface of the platen 55 in the Y-axis direction as a transport direction, a driven roller that rotates in accordance with the movement of the printing medium 5, and the like, and constitute the transport path for transporting the printing medium 5 from the supply unit 51 to the housing unit 52 via a printing region of the ink application portion 10. The printing region is a region in which the head 13 moves in the X-axis direction on the upper surface of the platen 55.

The printing control unit 30 includes an in-device interface 31, a CPU 32, a memory 33, a drive controller 34, and the like, and controls the printing unit 100.

The in-device interface 31 is coupled to the in-device interface 119 of the image processing unit 110 to transmit and receive data between the image processing unit 110 and the printing unit 100.

The CPU 32 is an arithmetic processing unit for overall control of the printing unit 100.

The memory 33 is a storage medium that secures a region for storing programs run by the CPU 32, a work region in which such programs run, and the like, and includes storage elements such as a RAM and an EEPROM.

The CPU 32 controls the ink application portion 10 and the moving unit 20 through the drive controller 34 according to the program stored in the memory 33 and the printing data received from the image processing unit 110.

The drive controller 34 includes firmware operating based on the control of the CPU 32 to control driving of the head unit 11 of the ink application portion 10, the ink supply unit 12, the scanning unit 40 of the moving unit 20, and transporting unit 50. The drive controller 34 includes drive control circuits including a transfer control signal generating circuit 35, a discharge control signal generating circuit 36, and a drive signal generating circuit 37, and a ROM and a flash memory incorporating firmware controlling the drive control circuits. The ROM and the flash memory containing the firmware for controlling the drive control circuits are omitted from the drawings. Here, ROM means Read-Only Memory.

The transfer control signal generating circuit 35 is a circuit that generates a signal for controlling the scanning unit 40 and the transporting unit 50 of the moving unit 20, based on the printing data, according to an instruction from the CPU 32.

The discharge control signal generating circuit 36 is a circuit that generates a head control signal for selecting the nozzle for discharging ink, selecting the amount to be discharged, controlling the discharge timing, and the like, based on the printing data in accordance with instructions from the CPU 32.

The drive signal generating circuit 37 is a circuit that generates a drive signal driving a pressure generating chamber provided in the head 13.

According to the configuration described above, the printing control unit 30 prints a desired image on the printing medium 5 by repeating, with respect to the printing medium 5 supplied to the printing region by the supply unit 51, and the transport roller 53, an operation of discharging ink droplets from the head 13 while moving the carriage 41 that supports the head 13 along the guide shaft 42 in the X-axis direction, and an operation of moving, by the transport roller 53, the printing medium 5 in the +Y direction intersecting with the X-axis direction.

Printing on the printing medium 5 is started by transmitting printing data to the printing unit 100 from the image processing unit 110. The printing data is generated by the printer driver.

Figure 3:
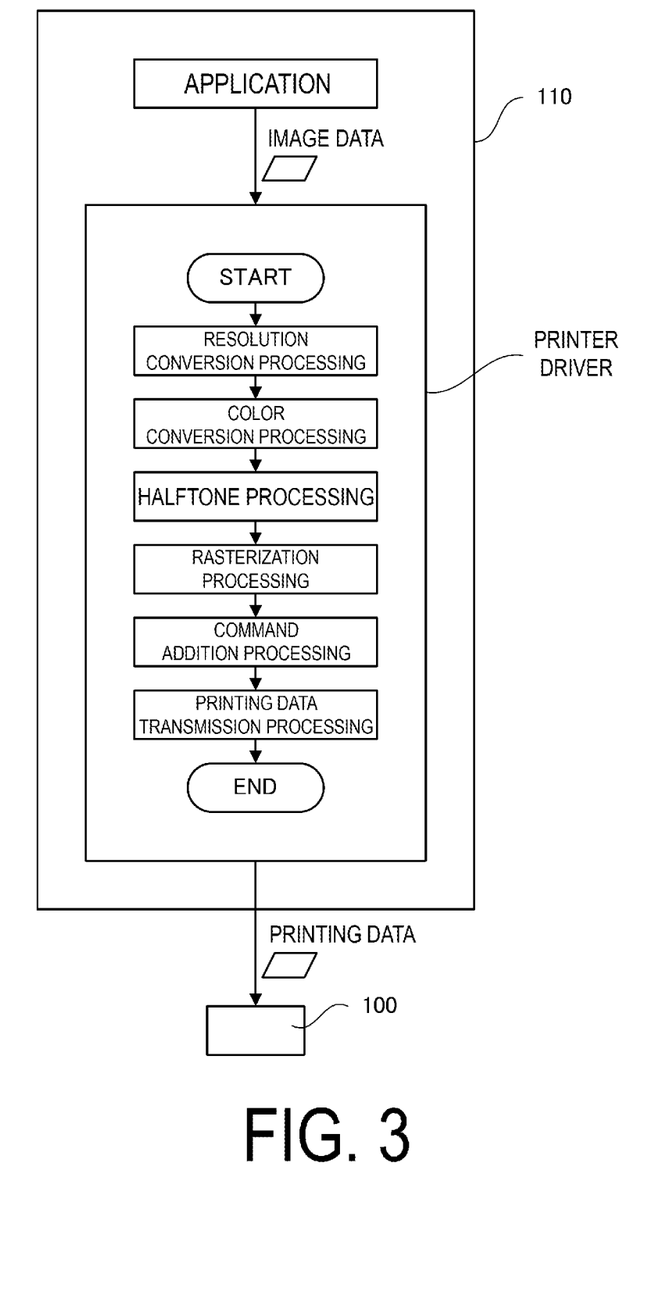
FIG. 3 is an explanatory view of basic functions of a printer driver.

With reference to FIG. 3, description is given below of printing data generation processing performed by the printer driver.

The printer driver receives image data from the image processing application, converts the image data into printing data in a format that can be interpreted by the printing unit 100, and then outputs the printing data to the printing unit 100. For the conversion of the image data from the image processing application into the printing data, the printer driver performs resolution conversion processing, color conversion processing, halftone processing, rasterization processing, command addition processing, and the like.

Note that, the step of receiving image data from the image processing application when the printer driver performs the printing data generation processing is a step of acquiring the image data in the present exemplary embodiment.

The resolution conversion processing is processing of converting a resolution of the image data outputted from the image processing application into a resolution for printing on the printing medium 5. For example, when the resolution during printing is specified as 720×720 dpi, vector format image data received from the image processing application is converted into bit map format image data having a 720×720 dpi resolution. Each pixel data of the image data after the resolution conversion processing includes pixels arranged in a matrix pattern. Each pixel has a gray scale value in, for example, 256 gray scales in the RGB color space. That is, each piece of the pixel data after the resolution conversion indicates the gray scale value of the corresponding pixel. Hereinafter, gray scale value data in the RGB color space is referred to as RGB data.

Among the pixels arranged in the matrix pattern, the pixel data corresponding to one row of pixels aligned in a predetermined direction is called raster data. Note that the predetermined direction in which the pixels corresponding to the raster data are aligned corresponds to a direction in which the head 13 moves when printing an image, specifically, the X-axis direction. In other words, the movement direction of the head 13 is a relative movement direction in which the head 13 and the printing medium 5 move relatively.

The color conversion processing is processing for converting RGB data of image data into gray scale value data of a CMYK color space. CMYK colors refer to cyan, magenta, yellow, and black, respectively. The image data of the CMYK color space is data corresponding to the colors of the ink of the printing unit 100. Therefore, when the printing unit 100 uses four types of ink of the CMYK color system, the printer driver generates image data in a four-dimensional space of the CMYK color system based on the RGB data. Gray scale value data of the CMYK color space is, in other words, ink amount data. Hereinafter, the gray scale value data of the CMYK color space is referred to as CMYK data.

This color conversion processing is performed based on a color conversion look-up table in which the gray scale values of the RGB data and the gray scale values of the CMYK data are associated with each other. Note that the pixel data after the color conversion processing is the CMYK data of 256 tones expressed in, for example, the CMYK color space. In the present exemplary embodiment, the step of performing the color conversion processing is an ink amount data generating step of generating ink amount data based on acquired image data.

The halftone processing is processing of converting data of a large number of gray scales, for example, data of 256 gray scales into data of the number of gray scales that can be formed by the printing unit 100. Through this halftone processing, data expressing 256 gray scales is converted into, for example, 1-bit half tone data expressing two gray scales, that is, a dot and no dot, and 2-bit half tone data expressing four gray scales, that is, no dot, a small dot, a medium dot, and a large dot. Specifically, from a dot generation ratio table in which gray scale values from 0 to 255 and dot generation ratios are associated with each other, a dot generation ratio corresponding to a gray scale value is determined. As a dot generation ratio determined in accordance with a gray scale value, for example, in a case of the four gray scales, a dot generation ratio for each of no-dot, the small dot, the medium dot, and the large dot is determined. In each generation ratio acquired, pixel data is generated such that dots are formed in a dispersed manner using a dither method, an error diffusion method, and the like.

The rasterization processing is processing of rearranging the above-described 1-bit or 2-bit pixel data aligned in a matrix pattern, according to a dot formation order for printing. The rasterization processing includes pass allocation processing of allocating the image data including pixel data resulting from the halftone processing to each pass in which the head 13 discharges ink droplets while moving. Once the pass allocation is completed, actual nozzles that form respective raster lines constituting the printing image are allocated.

The command addition processing is processing of adding command data corresponding to a printing method, to the rasterized data. The command data is, for example, transporting data related to transport specifications of the printing medium 5. The transport specifications include, for example, displacement and a speed of the printing medium 5 in the transport direction on the upper face of the platen 55.

The series of processing by the printer driver is performed by the ASIC 116 and the DSP 117 under the control of the CPU 115. Then, in printing data transmission processing, the printing data generated by the series of processing is transmitted to the printing unit 100 through the in-device interface 119.

Next, with reference to FIG. 4 and FIG. 5, an example of a basic flow of creation processing of a color conversion look-up table performed by a color conversion look-up table creation program will be described.

Figure 4:
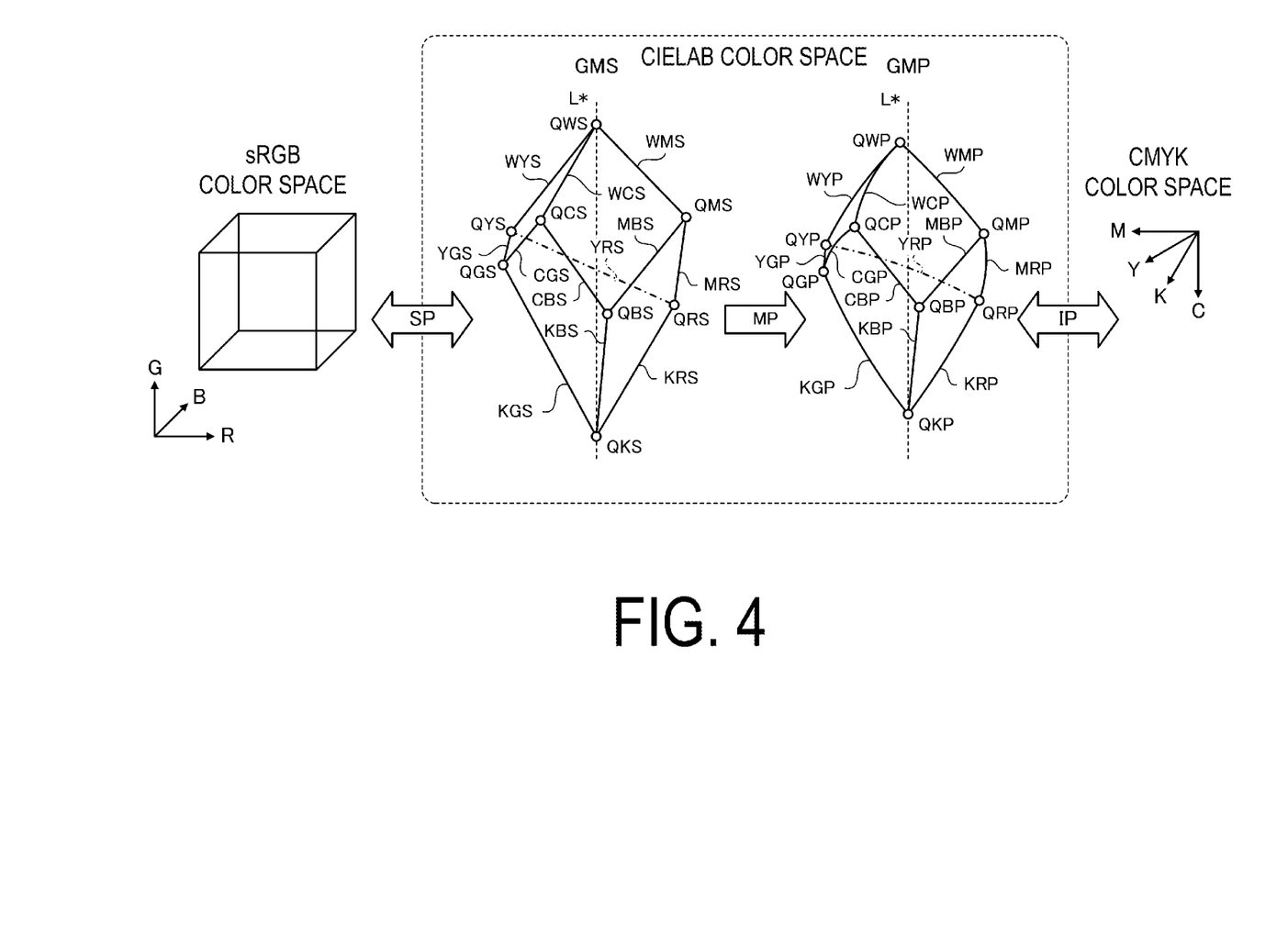
FIG. 4 is a conceptual diagram illustrating a relationship among respective color spaces in a color conversion.
Figure 5:
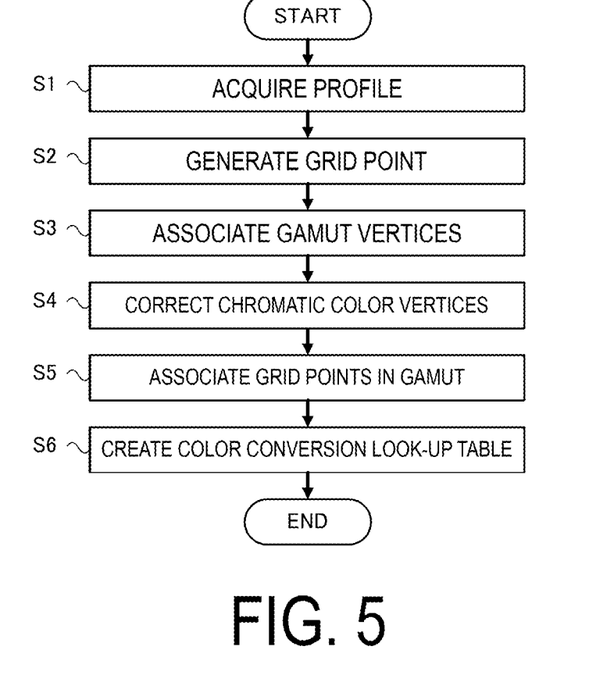
FIG. 5 is a flowchart illustrating an example of a creation method of a basic mapping table and a color conversion look-up table.

Here, as an example of processing of converting RGB data of image data to CMYK data for printing as illustrated in FIG. 4, an example is described for converting sRGB data, which is one standard RGB standard, into data in the CMYK color space, which is a space of ink amount data, via a CIELAB color space as a profile coupling space. The CIELAB color space is a CIE1976 (L* a* b*) color space. CIE means Commission Internationale de l'Eclairage.

A color conversion look-up table is a look-up table that associates a gray scale value of sRGB data with a gray scale value of CMYK data, and is created by a source profile SP, a mapping table MP, and an ink amount profile IP.

A source profile is a look-up table that is created in advance with attributes of image data, and the source profile SP is a look-up table defining a correspondence relationship between coordinate values in an sRGB color space and L* a* b* values, which are coordinate values in the CIELAB color space. A color gamut in which the sRGB color space is reproducible is associated with a source gamut GMS indicated by L* a* b* values by the source profile SP. In the present exemplary embodiment, the source gamut GMS is a color gamut of a color space of image data.

Note that, in the present exemplary embodiment, a coordinate of the sRGB color space is expressed by a gray scale value of an integer from 0 to 255. It is sufficient that the source profile SP can define a correspondence relationship between coordinates of the sRGB color space and L* a* b* values in the CIELAB color space, and the correspondence relationship may be given by a conversion expression.

The ink amount profile is a look-up table that is created in advance in accordance with specifications of the printing apparatus 1, and ink amount profile IP is a look-up table defining a correspondence relationship between coordinate values in the CMYK color space of the printing unit 100 and L* a* b* values in the CIELAB color space. The CMYK color space is a color space that is reproducible by ink used by the printing unit 100, and coordinates in the CMYK color space express a combination of respective ink amounts of CMYK. A coordinate in the CMYK color space is expressed as a gray scale value of an integer from 0 to 255. By specifying coordinates in the CMYK color space to the printing unit 100, the printing unit 100 reproduces ink coverage corresponding to a ratio of an ink amount corresponding to the coordinates on the printing medium 5. Indeed, as described above, the coordinate data in the CMYK color space is processed by processing after the halftone processing to generate printing data, and the printing unit 100 is driven by the printing data. By reproducing ink coverage based on the coordinates in the CMYK color space on the printing medium 5 by the printing unit 100, a color of the L* a* b* values corresponding to coordinates in the CMYK color space is reproduced.

A color gamut that is reproducible by the printing unit 100 is limited by the printing unit 100 and specifications of ink used by the printing unit 100, and is associated with a printer gamut GMP indicated by the L* a* b* values by the ink amount profile IP.

In the example of the printing unit 100 according to the present exemplary embodiment, as illustrated in FIG. 4, in the CIELAB color space, the source gamut GMS and the printer gamut GMP differ in size in the CIELAB color space, and the printer gamut GMP is less than the source gamut GMS. In other words, the color gamut that the printing unit 100 can reproduce becomes a color gamut that is narrower than a color gamut of image data. Therefore, coordinates of each grid point of the source gamut GMS are mapped to correspond to coordinates of each grid point of the printer gamut GMP. This table associating the coordinates of the respective grid point is the mapping table MP.

The source gamut GMS and the printer gamut GMP each includes a color gamut surrounded by six surfaces. Lines coupling the respective surfaces constitute ridges, and a point at which the ridges intersect constitute a vertex.

Eight vertices in the source gamut GMS have L* a* b* values, obtained by converting eight vertices in the sRGB color space by the source profile SP. The eight vertices in the sRGB color space are K vertex (R, G, B)=(0, 0, 0), R vertex (255, 0, 0), G vertex (0, 255, 0), B vertex (0, 0, 255), Y vertex (255, 255, 0), M vertex (255, 0, 255), C vertex (0, 255, 255), and W vertex (255, 255, 255).

The ridge in the source gamut GMS corresponds to a locus of L* a* b* values obtained by converting each ridge in the sRGB color space by the source profile SP.

Hereinafter, the eight vertices in the source gamut GMS are referred to as source vertices QWS, QRS, QGS, QBS, QCS, QMS, QYS, and QKS, and of these, the source vertices QRS, QGS, QBS, QCS, QMS, and QYS are referred to as source chromatic color vertices. Further, the source vertex QWS corresponds to a highest lightness point, and the source vertex QKS corresponds to a lowest lightness point. That is, in the present exemplary embodiment, the source vertex QWS is a white point, and the source vertex QKS is a black point.

The ridges of the source gamut GMS corresponding to a locus of L* a* b* values obtained by converting the ridges of (R, G, B)=(255, 255, x), (255, x, 255), (x, 255, 255) in the sRGB space by the source profile SP are referred to as source ridges WYS, WMS, and WCS, respectively. Note that, x indicates an integer from 0 to 255. Further, the ridges of the source gamut GMS corresponding to a locus of L* a* b* values obtained by converting the ridges of (R, G, B)=(0, 0, x), (0, x, 0), (x, 0, 0) in the sRGB space by the source profile SP are referred to as source ridges KRS, KGS, and KBS, respectively. Furthermore, the ridges of the source gamut GMS that do not include the source vertices QWS and QKS are referred to as source ridge MRS, MBS, YRS, YGS, CBS, and CGS, respectively.

The printer gamut GMP also has eight vertices. The vertices are printer vertices QWP, QRP, QGP, QBP, QCP, QMP, QYP, and QKP, and of these, the printer vertices QRP, QGP, QBP, QCP, QMP, and QYP are also referred to as printer chromatic color vertices. The printer vertices QWP, QRP, QGP, QBP, QCP, QMP, QYP, and QKP, correspond to L* a* b* values of colors reproduced when the printing unit 100 performs printing with ink amounts of (C, M, Y, K)=(0, 0, 0, 0), (0, 255, 255, 0), (255, 0, 255, 0), (255, 255, 0, 0), (255, 0, 0, 0), (0, 255, 0, 0), (0, 0, 255, 0), and (255, 255, 255, 0), respectively. Note that, for the printer vertex QKP, ink amounts of the CMY inks are substituted by an ink amount of the K ink in consideration of an ink ejection amount limit of the printing unit 100.

The printer gamut GMP includes printer ridges WCP, WMP, and WYP coupling the printer vertices QCP, QMP, QYP, and the printer vertex QWP, respectively.

The printer ridge WCP is an ink amount that varies asymptotically from (C, M, Y, K)=(0, 0, 0, 0) to (255, 0, 0, 0), the printer ridge WMP is an ink amount that varies asymptotically from (C, M, Y, K)=(0, 0, 0, 0) to (0, 255, 0, 0), and the printer edge WYP is an amount of ink that varies asymptotically from (C, M, Y, K)=(0, 0, 0, 0) to (0, 0, 255, 0), and the printer ridges each correspond to a locus of L* a* b* values when printing is performed. That is, when a color reproduced by only a monochromatic ink is plotted in the CIELAB color space, the printer ridges WYP, WMP, and WCP are formed. The CMY inks each have ability to reproduce a high chroma color in respective corresponding hues, and the reproduced color with the monochromatic ink constitutes an outermost ridge in the printer gamut GMP.

The printer gamut GMP includes printer ridges KRP, KGP, and KBP that couple the printer vertices QRP, QGP, QBP, and the printer vertex QKP, respectively.

The printer ridge KRP is an ink amount that varies asymptotically from (C, M, Y, K)=(0, 255, 255, 0) to (0, 0, 0, 255), the printer ridge KGP is an ink amount that varies asymptotically from (C, M, Y, K)=(255, 0, 255, 0) to (0, 0, 0, 255), and the printer edge KBP is an amount of ink that varies asymptotically from (C, M, Y, K)=(255, 255, 0, 0) to (0, 0, 0, 255), and the printer ridges each correspond to a locus of L* a* b* values when printing is performed. At this time, the ink amount of K replaces part of the CMY inks with the K ink as appropriate, for example, as a method thereof, a UCR method or the like is known. UCR means under color removal.

Note that, the present exemplary embodiment is characterized in specifications when replacing part of the CMY inks with the K ink, and the ink amount at the printer vertex QKP is not (C, M, Y, K)=(0, 0, 0, 255). A specific description will be given later.

Furthermore, ridges of the printer gamut GMP that do not include the printer vertex QWP and QKP is referred to as printer ridges MRP, MBP, YRP, YGP, CBP, and CGP.

Next, an example of a basic mapping table MP creation method and a basic color conversion look-up table creation method will be described along a flowchart illustrated in FIG. 5.

First, in step S1, the source profile SP and the ink amount profile IP are acquired.

Next, in step S2, coordinate information of all grid points constituting the source gamut GMS in the CIELAB color space is generated based on the source profile SP. Additionally, based on the ink amount profile IP, coordinate information of all grid points constituting the printer gamut GMP is generated.

Next, in step S3, coordinates of eight vertices of the respective gamuts are associated.

Specifically, coordinates of the source vertex QKS are associated with coordinates of the printer vertex QKP, coordinates of the source vertex QWS are associated with coordinates of the printer vertex QWP, and coordinates of the six source chromatic color vertices are associated with coordinates of six printer chromatic color vertices of a corresponding hue.

Next, in step S4, the coordinates of the associated six printer chromatic color vertices are corrected as necessary. Since the hue of the printer chromatic color vertex depends on a type of color material of each ink, a printing medium, or the like, respective hue angles of the source chromatic color vertex and the printer chromatic color vertex, and a relationship between respective relative hue angles do not match in some cases. Also, a maximum chroma point in the printer gamut GMP does not necessarily match a printer vertex, and the maximum chroma point and a printer vertex are different in some cases. Thus, in step S4, as appropriate, that is, in accordance with a state of difference in the hue of the chromatic color vertices and the coordinates of the maximum chroma point, the coordinates of each of the associated six printer chromatic vertices are corrected to the coordinates of the maximum chroma point at a hue angle closest to a hue angle of a corresponding source chromatic color vertex.

Next, in step S5, coordinates of grid points other than the eight vertices of the source gamut GMS are associated with coordinates of grid points of the printer gamut GMP. Specifically, based on data of the coordinates of the eight vertices in the source gamut GMS and the eight vertices in the printer gamut GMP associated therewith, coordinates of each grid point in the source gamut GMS are associated with coordinates of a grid point in the printer gamut GMP, so as to retain a ratio of distances between grid points in the source gamut GMS, or a ratio of color differences.

From step S2 to step S5, the mapping table MP that associates the coordinates of each grid point of the source gamut GMS with the coordinates of each grid point of the printer gamut GMP is completed.

Next, in step S6, a color conversion look-up table is created by the source profile SP, the ink amount profile IP, and the completed mapping table MP. Specifically, a look-up table is created that associates gray scale values of sRGB data with gray scale values of CMYK data derived by inputting the gray scale value of the sRGB data, via the source profile SP, the mapping table MP, and the ink amount profile IP, and is stored in the storage unit 114 as a color conversion look-up table.

With respect to the basic color conversion look-up table creation method described above, the present exemplary embodiment is characterized in the specifications of the ink amount profile IP in which the specifications for replacing part of the CMY inks with the K ink in a vicinity of the black point are reflected. Specifically, conversion is performed so as to result in ink amounts of the respective CMYK inks such that, when part of the CMY inks is replaced with the K ink, lightness of a composite color by a plurality of inks excluding the K ink, that is, the CMY inks, based on ink amount data of each of the CMYK inks corresponding to a coordinate on a straight line from a freely-selected coordinate point toward a black point in a predetermined hue range of the source gamut GMS, at least does not increase in a direction from the freely-selected coordinate point toward the black point.

In the color conversion look-up table of the present exemplary embodiment, when the color conversion look-up table is created, the characteristics described above, that is, the characteristic where the ink amount of each of the CMYK inks is obtained such that the lightness of the composite color by the CMY inks at least does not increase in the direction from a freely-selected coordinate point toward the black point is reflected in the specifications of the ink amount profile IP, and the color conversion look-up table is created in advance using this ink amount profile IP.

In other words, when generating ink amount data based on image data to be printed, the control unit 60 generates the ink amount data, using the color conversion look-up table created using the ink amount profile IP described above, as ink amount data of each of the CMYK inks such that, lightness of a composite color by a plurality of inks excluding the K ink, that is, the CMY inks, based on ink amount data of each of the CMYK inks corresponding to a coordinate on a straight line from a freely-selected coordinate point toward a black point in a predetermined hue range of the source gamut GMS, at least does not increase in a direction from the freely-selected coordinate point toward the black point.

Here, the predetermined hue range is a hue range of a target to which the effect of the present exemplary embodiment is exerted, and can be arbitrarily determined when the ink amount profile IP is prepared. In the determined hue range of the target, the ink amount profile IP is determined under sufficient assessment while the above characteristics are reflected. When a hue range of a target is not set as a predetermined hue range, a color conversion look-up table is to be generated by creating the ink amount profile IP in which the characteristics described above are reflected, in an entire hue range.

The above-described characteristics can be grasped as characteristics of a printing method for performing printing using a plurality of inks including a black-based ink based on image data to be printed, that is a printing method, based on the image data, including an ink amount data generating step of generating ink amount data for each of the plurality of inks, and a printing step of performing printing, based on the generated ink amount data.

That is, the printing method according to the present exemplary embodiment is characterized to include the ink amount data generating step of creating ink amount data as ink amount data such that lightness of a composite color at least does not increase in a direction from a freely-selected coordinate point toward a black point, the composite color being formed by a plurality of inks excluding a black-based ink based on ink amount data of each of the plurality of inks corresponding to a coordinate on a straight line from the freely-selected coordinate point toward the black point in a predetermined hue range of a color gamut of a color space of image data.

Specific embodiments will be described with reference to FIG. 6 to FIG. 9. In each figure, C means the cyan ink, M means the magenta ink, and Y means the yellow ink.

Figure 6:
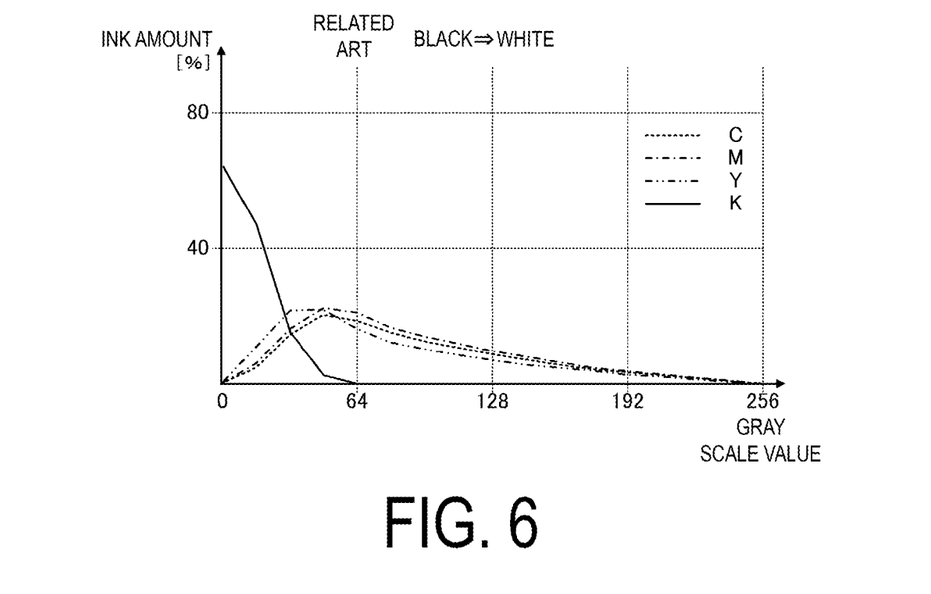
FIG. 6 is a graph illustrating an example of a ratio of an ink amount of each of CMYK inks corresponding to a gray scale value of image data from a black point toward a white point in the related art.
Figure 7:
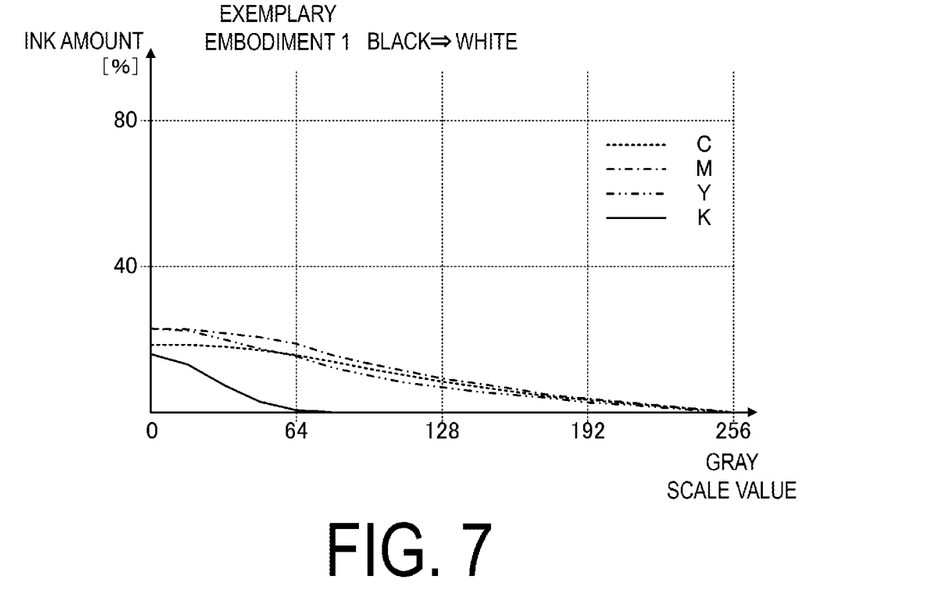
FIG. 7 is a graph illustrating an example of a ratio of an ink amount of each of the CMYK inks corresponding to a gray scale value of image data from a black point toward a white point in Exemplary Embodiment 1.

FIG. 6 and FIG. 7 each illustrate an example of a ratio of a gray scale value of image data from a black point toward a white point, that is a gray scale value of sRGB data in an achromatic color axis of the source gamut GMS, and an ink amount of each of the CMYK inks corresponding to the gray scale value. FIG. 6 illustrates an example of the related art, and FIG. 7 illustrates an example of the present exemplary embodiment. Here, the white point is one coordinate point among arbitrary coordinate points in a predetermined hue range.

Note that, a value of a ratio of each ink amount illustrated in FIG. 6 to FIG. 9 indicates a value of a ratio to a predetermined ink amount, that is, a value indicating a relative ratio, and does not indicate a ratio of each ink to a total amount of the CMYK inks.

In the related art, as illustrated in FIG. 6, in a range close to the black point, a composite black expressed by approximately the same amount of the CMY inks is sequentially replaced by black with the K ink, that is, an ink amount of each of the CMY inks is sequentially decreased, and only the K ink is discharged at the black point. In a direction from the white point toward the black point, a direction in which the ink amounts of the CMY inks similarly decrease is a direction in which lightness of the composite black expressed by the CMY inks excluding the K ink increases. Conversely, in a range close to the black point, the lightness of the composite black decreases as a distance from the black point increases. Therefore, when the K ink becomes faded due to a change over time, and lightness thereof is increased, an effect of the lightness of the composite black occurs, and therefore, a region where the lightness is reversed may be generated, such as a darkest portion of a printed image becoming no longer the darkest portion.

In contrast, in the example of the present exemplary embodiment illustrated in FIG. 7, the ink amount of each of the CMY inks at least does not decrease in the direction from the white point toward the black point, in a region of all gray scale values, including the region where the composite black by the CMY inks is replaced by the K ink. In other words, the ink amount data is given such that the lightness of the composite color by the CMY inks excluding the K ink based on the ink amount data of each of the CMYK inks corresponding to the coordinate on the straight line from the white point toward the black point at least does not increase, in the direction from the white point toward the black point. As a result, compared to the related art, a usage ratio of the K ink is low, but even when the K ink becomes faded due to a change over time, and lightness thereof increases, a region where the lightness is reversed does not occur.

Figure 8:
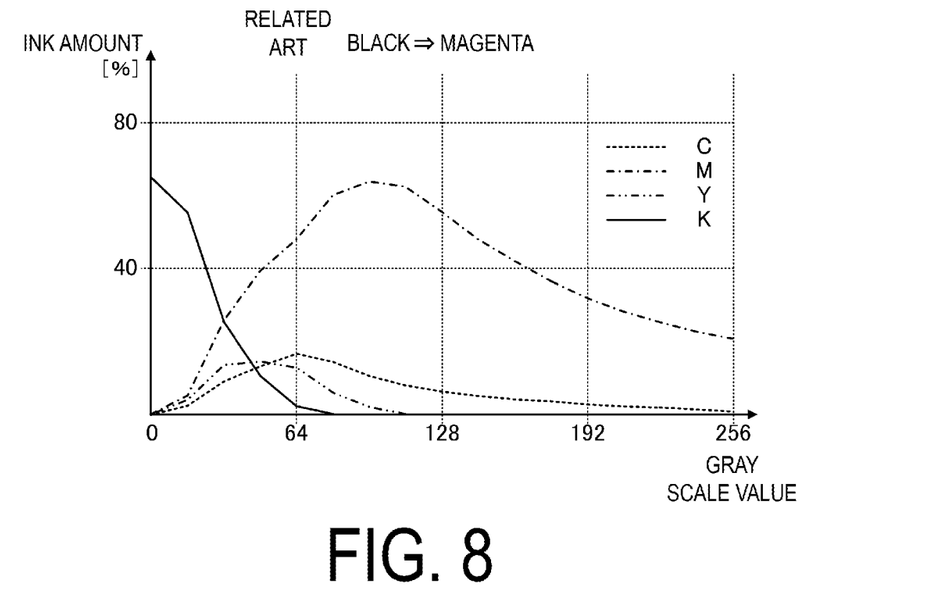
FIG. 8 is a graph illustrating an example of a ratio of an ink amount of each of the CMYK inks corresponding to a gray scale value of image data from a black point toward a maximum chroma point of magenta in the related art.
Figure 9:
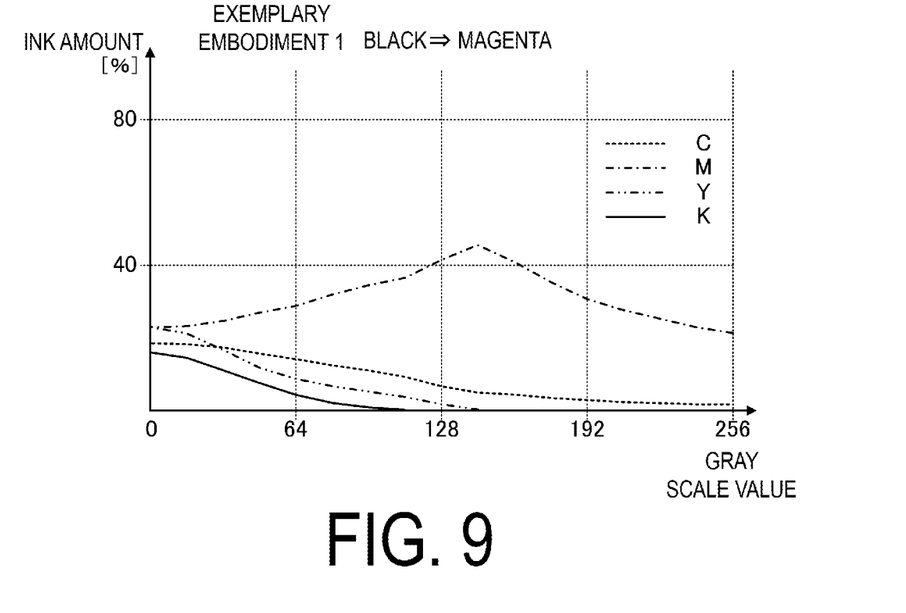
FIG. 9 is a graph illustrating an example of a ratio of an ink amount of each of the CMYK inks corresponding to a gray scale value of image data from the black point toward a maximum chroma point of magenta in Exemplary Embodiment 1.

FIG. 8 and FIG. 9 each illustrate an example of a ratio of a gray scale value of sRGB data of image data from a black point toward a maximum chroma point of magenta, and an ink amount of each of the CMYK inks corresponding to the gray scale value. FIG. 8 illustrates an example of the related art, and FIG. 9 illustrates an example of the present exemplary embodiment. Here, the maximum chroma point of magenta is one coordinate point among arbitrary coordinate points in a predetermined hue range.

In the related art, as illustrated in FIG. 8, in a range close to the black point, a composite black expressed by the CMY inks is sequentially replaced by black with the K ink, that is, an ink amount of each of the CMY inks is sequentially decreased, and only the K ink is discharged at the black point. In a direction from the maximum chroma point of magenta toward the black point, a direction in which the ink amounts of the CMY inks similarly decrease is a direction in which lightness of a composite color expressed by the CMY inks excluding the K ink increases. Conversely, in a range close to the black point, the lightness of the composite color decreases as a distance from the black point increases. Therefore, when the K ink becomes faded due to a change over time, and lightness thereof is increased, an effect of the lightness of the composite color occurs, and therefore, a region where the lightness is reversed may be generated, such as a darkest portion of a printed image becoming no longer the darkest portion.

In contrast, in the example of the present exemplary embodiment illustrated in FIG. 9, a ratio of replacement of the CMY inks that contribute to the composite black with the K ink is reduced, and the ink amount is given such that lightness of the composite color by the CMY inks excluding the K ink based on ink amount data of each of the CMYK inks corresponding to a coordinate on a straight line from the maximum chroma point toward the black point at least does not increase in a direction from the maximum chroma point of magenta toward the black point. As a result, compared to the related art, a usage ratio of the K ink is low, but even when the K ink becomes faded due to a change over time, and lightness thereof increases, a region where the lightness is reversed does not occur.

Here, as the specific embodiment, the cases where the freely-selected coordinate point in the predetermined hue range is the white point and the maximum chroma point of magenta have been described, but other coordinate points can be implemented similarly.

According to the printing apparatus and the printing method according to the present exemplary embodiment, the following effects can be obtained in printing that performs printing using CMYK inks.

Ink amount data for each of CMYK inks is generated as ink amount data such that lightness of a composite color at least does not increase in a direction from a freely-selected coordinate point toward a black point in a predetermined hue range, the composite color being formed by CMY inks excluding a K ink based on ink amount data of each of the CMYK inks. Therefore, even when the K ink becomes faded and brightness thereof increases, in the predetermined hue range, the lightness of the composite color by the CMY inks excluding the K ink is in lightness distribution where ranking corresponding to lightness distribution of image data is unchanged, and thus a region where the lightness is reversed does not occur. When an overall hue is set as a predetermined hue range, the same effect can be obtained in the overall hue.

2. Exemplary Embodiment 2

In the printing apparatus and the printing method according to Exemplary Embodiment 1, the example has been described in which a region where lightness is reversed does not occur even when the K ink completely becomes faded due to a change over time, but in the present exemplary embodiment, an example will be described in which a case is assumed in which a gray scale to decrease lightness as a gray color is left to a certain degree, even when the K ink becomes faded due to a change over time. Note that, the same configurations as those in Exemplary Embodiment 1 are given the same reference signs, and redundant description thereof will be omitted.

With respect to the specifications of the ink amount profile IP illustrated in the description of Exemplary Embodiment 1, in the ink amount profile IP of the present exemplary embodiment, conversion is performed so as to result in an ink amount of each of the CMYK inks such that, when part of the CMY inks is replaced with the K ink, lightness of a composite color by the plurality of inks excluding the K ink, that is the CMY inks, based on ink amount data for each of the CMYK inks corresponding to a coordinate on a straight line from a freely-selected coordinate point toward a black point in a predetermined hue range of the source gamut GMS, and by a virtual gray-based ink having lightness higher than the K ink based on ink amount data of the K ink by a predetermined amount, at least does not increase in a direction from the freely-selected coordinate point toward the black point.

In other words, when generating ink amount data based on image data to be printed, the control unit 60 generates the ink amount data, using the color conversion look-up table created using the ink amount profile IP described above, as ink amount data of each of the CMYK inks such that, lightness of a composite color by the plurality of inks excluding the K ink, that is, the CMY inks, based on ink amount data of each of the CMYK inks corresponding to a coordinate on a straight line from a freely-selected coordinate point toward a black point in a predetermined hue range of the source gamut GMS, and by a virtual gray-based ink having lightness higher than the K ink based on the ink amount data of the K ink by a predetermined amount, at least does not increase in a direction from the freely-selected coordinate point toward the black point.

Here, the virtual gray-based ink having the lightness higher than the K ink by the predetermined amount is, even when the K ink becomes faded due to a change over time, an achromatic color ink for which a case where a gray scale to decrease lightness as a gray color to a certain degree is left is assumed, that is, an achromatic color ink that exhibits lightness equivalent to the lightness of the K ink that became faded to the assumed degree. The virtual gray-based ink is a virtual ink for deriving ink amounts of the CMYK inks, and may be used in evaluation in determining the ink amount profile IP, but is not used for actual printing.

Figure 10:
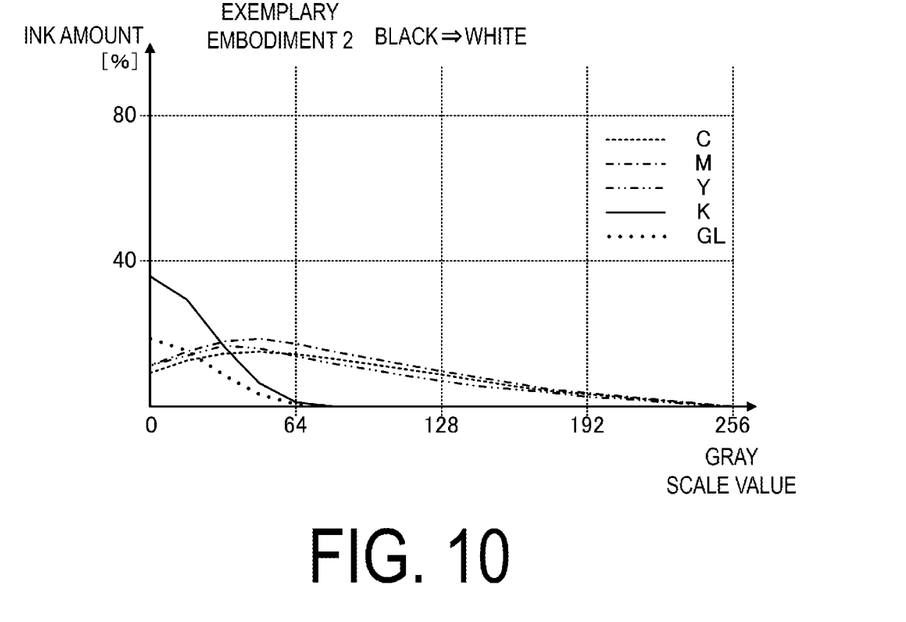
FIG. 10 is a graph illustrating an example of a ratio of an ink amount of each of the CMYK inks corresponding to a gray scale value of image data from a black point toward a white point in Exemplary Embodiment 2.

Next, a specific embodiment will be described with reference to FIG. 10. In FIG. 10, C denotes the cyan ink, M denotes the magenta ink, Y denotes the yellow ink, and GL denotes a gray ink as a virtual gray-based ink. Hereinafter, the gray ink is referred to as a GL ink.

FIG. 10 is a graph illustrating, when the present embodiment is applied, a ratio of a gray scale value of image data from a black point toward a white point, that is a gray scale value of sRGB data in an achromatic color axis of the source gamut GMS, and an ink amount of each of CMYK inks and the GL ink corresponding to the gray scale value.

In a range close to the black point, a composite black expressed by approximately the same amount of the CMY inks is sequentially replaced by black with the K ink, that is, the ink amount of each of the CMY inks is sequentially decreased, and replaced by the K ink. In a direction from the white point toward the black point, a direction in which the ink amounts of the CMY inks similarly decrease is a direction in which lightness of the composite black expressed by the CMY inks excluding the K ink increases. However, the ink amount data is given such that lightness of a composite color expressed by the CMY inks and the GL ink at least does not increase. A usage ratio of the K ink is lower compared to the related art, but can be a higher usage ratio than in the case of Exemplary Embodiment 1.

According to the present exemplary embodiment, the following advantages can be obtained.

Ink amount data for each of the CMYK inks is created as ink amount data such that lightness of a composite color at least does not increase in the direction from a freely-selected coordinate point toward a black point in a predetermined hue range, the composite color being formed by the CMY inks excluding the K ink based on ink amount data of each of the CMYK inks, and the GL ink as a virtual gray-based ink having lightness higher than the K ink based on ink amount data of the K ink by a predetermined amount. In other words, the lightness of the composite color by the GL ink having higher lightness than the K ink by the predetermined amount, and the CMY inks excluding the K ink, at least does not increase in the direction from the freely-selected coordinate point toward the black point. Therefore, even when the K ink becomes faded and the lightness thereof increases by the predetermined amount, a region where the lightness is reversed does not occur in the predetermined hue range. When an overall hue is set as a predetermined hue range, the same effect can be obtained in the overall hue.

3. Exemplary Embodiment 3

In the present exemplary embodiment, a printing apparatus configured so that whether printing is performed by the printing method described in Exemplary Embodiment 1 or printing is performed by the related art can be selected will be described. Note that, the same configurations as those in Exemplary Embodiment 1 are given the same reference signs, and redundant description thereof will be omitted.

Of the control by the control unit 60 described in Exemplary Embodiment 1, control for generating ink amount data is referred to as first ink amount data generating control, as ink amount data such that lightness of a composite color at least does not increase in a direction from a freely-selected coordinate point toward a black point, the composite color being formed by a plurality of inks excluding a black-based ink based on ink amount data of each of the plurality of inks corresponding to a coordinate on a straight line from the freely-selected coordinate point toward the black point in a predetermined hue range of a color gamut of a color space of image data. Specifically, the control unit 60, as the first ink amount data generating control, generates ink amount data as ink amount data such that lightness of a composite color at least does not increase in a direction from a freely-selected coordinate point toward a black point, the composite color being formed by the CMY inks excluding the K ink based on ink amount data of each of the CMYK inks corresponding to a coordinate on a straight line from the freely-selected coordinate point toward the black point in a predetermined hue range of a color gamut of a color space of image data.

Further, the control unit 60, as second ink amount data generating control as an example of the related art, performs controlling for generating ink amount data as ink amount data such that lightness of a composite color at least does not decrease in a direction from a freely-selected coordinate point toward a black point, the composite color being formed by a plurality of inks excluding a black-based ink based on ink amount data of each of the plurality of inks corresponding to a coordinate on a straight line from the freely-selected coordinate point toward the black point in a predetermined hue range of a color gamut of a color space of image data, in a range where an ink amount of the black-based ink occurs. Specifically, the control unit 60, as the second ink amount data generating control, generates ink amount data as ink amount data such that lightness of a composite color at least does not decrease in a direction from a freely-selected coordinate point toward a black point, the composite color being formed by the CMY inks excluding the K ink based on ink amount data of each of the CMYK inks corresponding to a coordinate on a straight line from the freely-selected coordinate point toward the black point in a predetermined hue range of a color gamut of a color space of image data, in a region where an ink amount of the K ink occurs. More specifically, by the second ink amount data generating control, the ink amount of each of the CMY inks is reduced by being sequentially replaced with black by the K ink, in a range close to the black point, and only the K ink is discharged at the black point.

That is, in printing by the ink amount data generated by the second ink amount data generating control, when the K ink becomes faded due to a change over time, and lightness thereof is increased, an effect of lightness of a composite black occurs, and therefore, a region where the lightness is reversed may be generated, such as a darkest portion of a printed image becoming no longer the darkest portion.

In the printing by the ink amount data generated by the first ink amount data generating control, amounts of the CMY inks used in the black point and a gray scale region close to the black point increase, and an amount of the K ink used decreases, compared to the printing by the ink amount data generated by the second ink amount data generating control. In other words, in the printing in the black point and the gray scale region close to the black point, the K ink can be used more, by using the printing by the ink amount data generated by the second ink amount data generating control.

Therefore, in printing that does not need to account for an effect of fading of the K ink, particularly when by increasing the K ink, or decreasing the amounts of the CMY inks used at the black point and in the gray scale region close to the black point, improvement of print quality can be expected, it is better to perform printing by the ink amount data generated by the second ink amount data generating control.

Thus, the printing apparatus 1 is configured to be able to, as a function controlled by a printer driver, input an instruction from the input unit 112 to the control unit 60 of whether to perform printing by the ink amount data generated by the first ink amount data generating control, or to perform printing by the ink amount data generated by the second ink amount data generating control.

The printing apparatus 1 prepares, in advance, a first color conversion look-up table for converting into ink amount data generated by the first ink amount data generating control, and a second color conversion look-up table for converting into ink amount data generated by the second ink amount data generating control. The control unit 60, based on the input instruction, performs controlling whether to generate printing data based on the first color conversion look-up table, that is, based on the first ink amount data generating control, or to generate printing data based on the second color conversion look-up table, that is, based on the second ink amount data generating control.

According to the present exemplary embodiment, when the first ink amount data generating control is performed, ink amount data for each of the CMYK inks is generated as ink amount data such that lightness of a composite color at least does not increase in a direction from a freely-selected coordinate point toward a black point in a predetermined hue range, the composite color being formed by the CMY inks excluding the K ink based on ink amount data of each of the CMYK inks. Therefore, even when the K ink becomes faded and brightness thereof increases, in the predetermined hue range, the lightness of the composite color by the CMY inks excluding the K ink is in lightness distribution where ranking corresponding to lightness distribution of image data is unchanged, and thus a region where the lightness is reversed does not occur.

Further, when the second ink amount data generating control is performed, ink amount data for each of the CMYK inks is generated as ink amount data such that lightness of a composite color at least does not decrease in a direction from a freely-selected coordinate point toward a black point, in a range where an ink amount of the K ink occurs, the composite color being formed by the CMY inks excluding the K ink based on ink amount data of each of the CMYK inks. That is, by increasing the amount of the K ink in a direction approaching the black point, a degree of lowering lightness is increased. For example, to enhance initial quality of printing, printing in a region near the black point can be performed with an amount of the K ink increased.

As described above, according to the present exemplary embodiment, it is possible to select whether or not to perform printing taking into account fading of the K ink due to a change over time, thus convenience for a user is improved.

4. Exemplary Embodiment 4

In Exemplary Embodiment 3, the description has been given in which, in the printing without having to account for the effect of fading of the K ink, it is better to perform the printing by the ink amount data generated by the second ink amount data generating control, however, in the present exemplary embodiment, the control unit 60 is configured to determine a degree of effect of fading of the K ink based on an area ratio of a region onto which the K ink is discharged, and in accordance with a determination result, select control of any of the first ink amount data generating control and the second ink amount data generating control illustrated in Exemplary Embodiment 3. Specifically, when the area ratio of the region onto which the K ink is discharged is greater than a predetermined area ratio, the control unit 60 performs printing by ink amount data generated by the first ink amount data generating control, and when the area ratio of the region onto which the K ink is discharged is less than or equal to the predetermined area ratio, performs printing by ink amount data generated by the second ink amount data generating control.

Here, the predetermined area ratio is a threshold value for determining which of the first ink amount data generating control and the second ink amount data generating control to be performed, thus it is desirable to perform sufficient evaluation and to determine the area ratio in advance depending on a type and a purpose of a printed image to be targeted by the printing apparatus 1.

That is, the control unit 60, when the area ratio of the region onto which the K ink is discharged is greater than the predetermined area ratio, generates ink amount data as ink amount data such that, lightness of a composite color by the CMY inks excluding the K ink based on ink amount data of each of the CMYK inks corresponding to a coordinate on a straight line from a freely-selected coordinate point toward a black point in a predetermined hue range of a color gamut of a color space of image data, at least does not increase in a direction from the freely-selected coordinate point toward the black point, and when the area ratio of the region onto which the K ink is discharged is less than or equal to the predetermined area ratio, generates ink amount data, as ink amount data such that, lightness of a composite color by the CMY inks excluding the K ink based on ink amount data of each of the CMYK inks corresponding to a coordinate on a straight line from a freely-selected coordinate point toward a black point in a predetermined hue range of a color gamut of a color space of image data, at least does not decrease in a direction from the freely-selected coordinate point toward the black point in a range where an ink amount of the K ink occurs.

Specifically, the printing apparatus 1 prepares, in advance, the first color conversion look-up table for converting into ink amount data generated by the first ink amount data generating control, and the second color conversion look-up table for converting into ink amount data generated by the second ink amount data generating control. The control unit 60, based on image data to be printed, once generates printing data based on the second color conversion look-up table.

Next, the control unit 60 analyzes the generated printing data, and calculates an area ratio of a region onto which the K ink is discharged. The area ratio of the region onto which the K ink is discharged can be calculated as, for example, a ratio of an area of a region onto which the K ink is discharged at or above predetermined discharge density occupying in a total area of a printed image.

Next, when the calculated area ratio of the region onto which the K ink is discharged is greater than the predetermined area ratio set in advance, printing data is regenerated based on the first color conversion look-up table, and printing is performed. In addition, when the calculated area ratio of the region onto which the K ink is discharged is less than or equal to the predetermined area ratio set in advance, printing is performed by the printing data generated based on the second color conversion look-up table.

According to the present exemplary embodiment, the following effects can be obtained.

When the area ratio of the region onto which the K ink is discharged is large, a degree to which print quality deteriorates due to fading of the K ink is increased. In contrast, when the area ratio of the region onto which the K ink is discharged is greater than the predetermined area ratio, ink amount data for each of the CMYK inks is generated as ink amount data such that lightness of a composite color at least does not increase in a direction from a freely-selected coordinate point toward a black point in a predetermined hue range, the composite color being formed by the CMY inks excluding the K ink based on ink amount data of each of the CMYK inks. Therefore, even when the K ink becomes faded and brightness thereof increases, in the predetermined hue range, the lightness of the composite color by the CMY inks excluding the K ink is in lightness distribution where ranking corresponding to lightness distribution of image data is unchanged, and thus a region where the lightness is reversed does not occur.

In addition, when the area ratio of the region onto which the K ink is discharged is less than or equal to the predetermined area ratio, ink amount data for each of the CMYK inks is created as ink amount data such that lightness of a composite color at least does not decrease in a direction from a freely-selected coordinate point toward a black point, in a region where an ink amount of the K ink occurs, the composite color being formed by the CMY inks excluding the K ink based on ink amount data of each of the CMYK inks. That is, by increasing the amount of the K ink in a direction approaching the black point, a degree of lowering lightness is increased. When the area ratio of the region onto which the K ink is discharged is less than or equal to the predetermined area ratio, a degree to which print quality deteriorates by fading of the K ink due to a change over time is decreased, and therefore, for example, in order to increase a lightness range of printing, printing of a region close to the black point can be performed with a greater amount of the K ink.

What is claimed is:

1. A printing apparatus, comprising:
   a head configured to discharge a plurality of inks including a black-based ink; and
   a control unit configured to, based on image data to be printed, generate ink amount data for controlling an ink amount of each of the plurality of inks discharged by the head, and to control the head based on the ink amount data, wherein
   the control unit generates the ink amount data as ink amount data such that lightness of a composite color at least does not increase in a direction from a freely-selected coordinate point toward a black point, the composite color being formed by the plurality of inks excluding the black-based ink based on ink amount data of each of the plurality of inks corresponding to a coordinate on a straight line from the freely-selected coordinate point toward the black point in a predetermined hue range of a color gamut of a color space of the image data.

2. The printing apparatus according to claim 1, wherein the control unit,
   when an area ratio of a region onto which the black-based ink is discharged is greater than a predetermined area ratio, generates the ink amount data as ink amount data such that, lightness of a composite color at least does not increase in a direction from s freely-selected coordinate point toward the black point, the composite color being formed by the plurality of inks excluding the black-based ink based on ink amount data of each of the plurality of inks corresponding to a coordinate on a straight line from the freely-selected coordinate point toward the black point in a predetermined hue range of a color gamut of a color space of the image data, and
   when an area ratio of a region onto which the black-based ink is discharged is less than or equal to a predetermined area ratio, generates the ink amount data, as ink amount data such that, lightness of a composite color at least does not decrease in a direction from a freely-selected coordinate point toward a black point in a range where an ink amount of the black-based ink occurs, the composite color being formed by the plurality of inks excluding the black-based ink based on ink amount data of each of the plurality of inks corresponding to a coordinate on a straight line from the freely-selected coordinate point toward the black point in a predetermined hue range of a color gamut of a color space of the image data.

3. The printing apparatus according to claim 1, comprising:
   an input unit configured to enable an input of an instruction into the control unit, wherein
   the control unit, based on the input instruction, performs control of any of
   first ink amount data generating control for generating the ink amount data as ink amount data such that, lightness of a composite color at least does not increase in a direction from a freely-selected coordinate point toward a black point, the composite color being formed by the plurality of inks excluding the black-based ink based on ink amount data of each of the plurality of inks corresponding to a coordinate on a straight line from the freely-selected coordinate point toward the black point in a predetermined hue range of a color gamut of a color space of the image data, and
   second ink amount generating control for generating the ink amount data, as ink amount data such that, lightness of a composite color at least does not decrease in a direction from a freely-selected coordinate point toward a black point in a range where an ink amount of the black-based ink occurs, the composite color being formed by the plurality of inks excluding the black-based ink based on ink amount data of each of the plurality of inks corresponding to a coordinate on a straight line from the freely-selected coordinate point toward the black point in a predetermined hue range of a color gamut of a color space of the image data.

4. A printing method of, based on image data to be printed, performing printing using a plurality of inks including a black-based ink, the method comprising:
   an ink amount data generating step of, based on the image data, generating ink amount data of each of the plurality of inks; and
   a printing step of, based on the generated ink amount data, performing the printing, wherein
   the ink amount data generating step generates the ink amount data as ink amount data such that lightness of a composite color at least does not increase in a direction from a freely-selected coordinate point toward a black point, the composite color being formed by the plurality of inks excluding the black-based ink based on ink amount data of each of the plurality of inks corresponding to a coordinate on a straight line from the freely-selected coordinate point toward the black point in a predetermined hue range of a color gamut of a color space of the image data.

5. A printing apparatus, comprising:

a head configured to discharge a plurality of inks including a black-based ink; and a control unit configured to, based on image data to be printed, generate ink amount data for controlling an ink amount of each of the plurality of inks discharged by the head, and to control the head based on the ink amount data, wherein the control unit generates the ink amount data as ink amount data such that lightness of a composite color at least does not increase in a direction from a freely-selected coordinate point toward a black point, the composite color being formed by the plurality of inks excluding the black-based ink based on ink amount data of each of the plurality of inks corresponding to a coordinate on a straight line from the freely-selected coordinate point toward the black point in a predetermined hue range of a color gamut of a color space of the image data, and by a virtual gray-based ink having lightness higher than the black-based ink based on ink amount data of the black-based ink by a predetermined amount.

* * * * *